United States Patent [19]

Heyneman

[11] 4,348,160

[45] Sep. 7, 1982

[54] METERING SYRINGE

[75] Inventor: Guido Heyneman, Knokke, Belgium

[73] Assignee: Siemens Aktiengesellschaft, Berlin & Munich, Fed. Rep. of Germany

[21] Appl. No.: 124,139

[22] Filed: Feb. 25, 1980

[30] Foreign Application Priority Data

Mar. 20, 1979 [DE] Fed. Rep. of Germany ....... 2910946

[51] Int. Cl.³ .............................................. F04B 37/00
[52] U.S. Cl. ..................................... 417/403; 222/334
[58] Field of Search ................................ 222/261–263,
222/309, 334, 373, 504; 417/401, 402, 403, 317, 318

[56] References Cited

U.S. PATENT DOCUMENTS

| 3,180,527 | 4/1965 | Wasilewski et al. | |
| 3,192,969 | 7/1962 | Baruch et al. | |
| 3,500,753 | 3/1970 | Greene, Jr. | 417/403 |
| 3,666,147 | 5/1972 | Shiraki et al. | 222/309 |

FOREIGN PATENT DOCUMENTS 1178236 9/1964 Fed. Rep. of Germany .

Primary Examiner—H. Grant Skaggs

Attorney, Agent, or Firm—Hill, Van Santen, Steadman, Chiara & Simpson

[57] ABSTRACT

A metering syringe for transferring fluid media in predetermined volumes from one container to another container comprised of a unitary structural unit defined by a combination of a piston-burette, a pneumatic drive therefore and a pneumatically-actuated valve means, all operating from a common compressed air source. A double-headed piston of the pneumatic drive is attached to a free end of the piston rod from the piston-burette, with the diameter of the piston-rod being of such size relative to the diameter of the double-headed piston that the two pneumatically effective piston-head surfaces of the double-headed piston differs significantly from one another. A compressed air source is connected to the pneumatic drive on both sides of the double-headed piston so as to act on the respective piston-head surfaces in such a manner that the piston-head having a relatively smaller effective surface is constantly biased by the compressed air and the piston-head with a relatively larger effective surface is selectively biased by the compressed air to control movement of the double-headed piston. A somewhat similar double-headed piston arrangement is provided in the valve means and pneumatically interconnected with the pneumatic drive for cooperative operation therewith.

8 Claims, 3 Drawing Figures

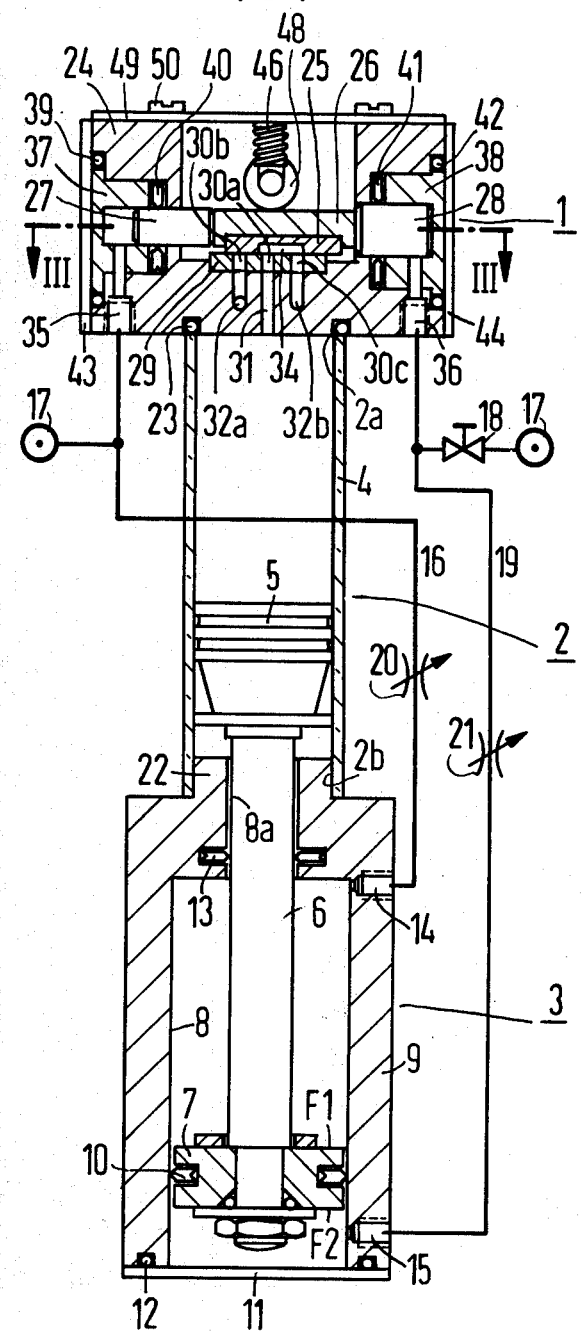
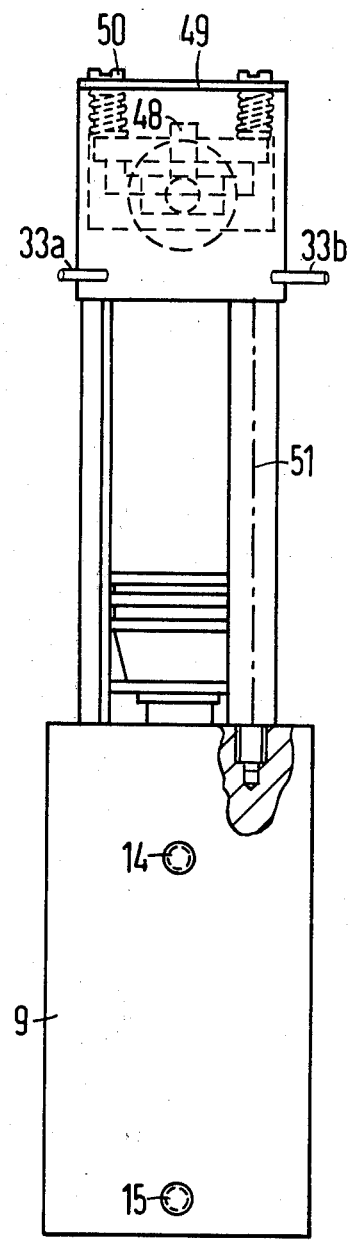

METERING SYRINGE

BACKGROUND OF THE INVENTION

1. Field of the Invention

The invention relates to metering syringes and somewhat more particularly to such syringes for transferring fluids in predetermined volumes from one container to another container and being comprised of a piston-burette with a pneumatic drive connected to a valve means in such a manner that the piston burette, the valve means and the pneumatic drive form a unitary structural unit.

2. Prior Art

In instances where a piston-burette is provided with a pneumatic drive, the cylinder of the pneumatic drive is typically attached to the piston-burette. In this combination, the cylinder of the pneumatic drive is attached to the housing of the piston-burette at the drive or output side of the drive. However, significant difficulties arise during assembly of such a unit because the glass cylinder and the piston, which typically is composed of metal, must be aligned exactly. Further, such a unit forms a very long shape, making it cumbersome.

The use of a pneumatic drive to actuate a piston-burette typically requires two valves, one for each direction in which the piston moves. While one side of a piston is under pressure, the other side of the piston must be evacuated. The control of these operations is only possible with so-called multi-path valves. After a piston stroke has been completed, the compressed air is typically switched-off and an operator cannot see, after the shutdown operation, whether the piston is in one or the other operative position. In order to positively prevent possible misconnections, special piston-positioned indicators must be provided. However, such requirement considerably increases the cost of such pneumatically driven piston-burettes.

SUMMARY OF THE INVENTION

The invention provides a metering syringe of the typed discussed earlier but which is relatively simple in construction, has a compact space-saving shape and which automatically indicates a current piston-position without a special piston-position indicator.

In accordance with the principles of the invention, a double-headed piston means of the pneumatic drive is attached to the free end of a piston rod extending out of a piston-burette, the other end of which moves a piston transferring fluids to a valve means mounted on the burette cylinder. The diameter of this piston-rod is selected of such size relative to the diameter of the double-headed piston that the two pneumatically effective piston-head surfaces of such double-headed piston differs significantly from one another. A compressed air source is connected to the pneumatic drive on both sides of the double-headed piston so as to act on the respective piston-head surfaces in such a manner that the piston-head having a relatively smaller effective surface is constantly charged with compressed air and the piston-head with a relatively larger effective surface is selectively charged with compressed air and controls the movement of the piston or motion of the pneumatic drive.

In preferred embodiments of the invention, the housing of the pneumatic drive is a cuboidal shape having a collar at an upper end of a size snuggly mating with the inner walls of a piston-burette cylinder. The collar is provided with an opening for accommodating a piston-rod extending downwardly from the piston-burette.

The valve means attached to the discharged end of the piston-burette cylinder, in addition to having intake and/or discharge nozzles, also preferably includes a pneumatically controllable slide valve means which includes a slide member moveable in a linearly perpendicular manner relative to the axis of motion of the piston-burette via piston-heads of different diameters positioned on opposite sides of the slide member and connected to a compressed air source in such a manner that the piston-head with a smaller diameter is constantly biased via compressed air and the piston-head with a larger diameter is selectively biased via compressed air to control movement of the slide member.

Such a valve means is disclosed and claimed in co-pending commonly assigned application Ser. No. 124,360, filed Feb. 25, 1980.

In preferred embodiments of the invention, a particularly simple control useful in conjunction with the compressed air-actuated valve means described above and the pneumatic drive comprises connecting a common compressed air source with corresponding size piston-heads of the valve means and corresponding size piston-heads of the pneumatic drive for the piston-burette and positioning choke valves in the air conduits leading to the pneumatic drive so that the valve means is actuated prior to actuation of the pneumatic drive.

A specific embodiment of the invention comprises a combination of a pneumatic drive, a piston-burette and a valve means attached to one another to form a unitary compact structural unit. The pneumatic drive comprises a cubically-shaped housing having a piston chamber therein which communicates with an upper surface of the housing via a select size rod-passageway provided with a concentrically arranged collar of a size mating with a lower end of a glass cylinder of the piston-burette. The piston chamber is also provided with spaced-apart air passageways along sidewalls thereof for connection with conduits from a compressed air source. A double-headed piston mounted on a piston-rod operationally mating with the rod-passageway is positioned within the piston chamber for selective movement therein and seal means are provided between adjacent surfaces of the rod and the rod-passageway walls as well as between adjacent surfaces of the double-headed piston and the piston chamber walls. The piston-burette comprises a cylinder open at opposite ends thereof, with a piston body positioned within the cylinder in snug relation with the walls thereof for reciprocal movement up and down such cylinder. The piston body is attached at a lower surface thereof to a piston-rod extending downwardly out of the cylinder and into the rod-passageway of the pneumatic drive housing. The valve means comprises a valve block housing, preferably of a cubical shape, mounted on an open end of the piston-burette cylinder away from the piston-rod thereof. The valve block housing is provided with a chamber open on three spaced-apart surfaces thereof and having a plurality of fluid passageways, at least one of which is in fluid communication with the open end of the burette cylinder and the others of which selectively communicate with flow paths being regulated by the valve means and with air conduits from a compressed air source. A pressure-plate member having a select number of spaced-apart holes extending perpendicularly to the longitudinal axis of the plate is positioned on the bottom of such chamber so as to be aligned with the fluid passageways of the chamber communicating with the burette-cylinder and the flow paths regulated by the valve means. A slide member having at least one groove extending parallelly and/or perpendicularly to the longitudinal axis of the pressure-plate member is positioned in a slidable fashion on the pressure plate for cooperation therewith whereby certain holes in the pressure-plate member communicate with one another via the groove in the slide member. A double-headed piston is positioned along the bottom of the chamber so as to be reciprocally moveable along the longitudinal axis of the pressure-plate member with each of the piston-heads being of a different size relative to the other. Each of the piston-heads respectively mate with opposing chamber openings sealed by cover members to define piston chambers at opposite ends of the valve block housing. The piston-rod between these piston heads is provided with a receiving chamber on the side thereof facing the bottom of the chamber for receiving the slide member therein. Inlet and outlet nozzles are provided with orifices on another surface of the valve block housing and in communication with at least some of the holes in the pressure-plate member. Each piston-head chamber is provided with an air-passageway communicating with a compressed air source. The smaller diameter piston-head chamber is arranged so as to be in continuous direct communication with the compressed air source and the larger diameter piston-head chamber is arranged in selective communication with the compressed air source, as via a control valve actuated by compressed air, so as to selectively move the larger diameter piston-head in opposition to the smaller diameter piston-head when in communication with the compressed air source and thereby move the slide member to a select position on the pressure-plate member. A compression means is provided in the chamber urging the slide member against the pressure-plate member in a slidably sealing fashion. In preferred embodiments, such compression means comprises a spring acting on a ball-bearing in contact with the surface of the slide member.

BRIEF DESCRIPTION OF THE DRAWINGS

FIG. 1 is an elevated cross-sectional view, shown partially schematically, of an exemplary embodiment of a metering syringe constructed and operable in accordance with the principles of the invention;

FIG. 2 is an elevated side view, partially in cross-section and partially in phantom, of the metering syringe shown at FIG. 1.

DESCRIPTION OF THE PREFERRED EMBODIMENTS

Figure 3:
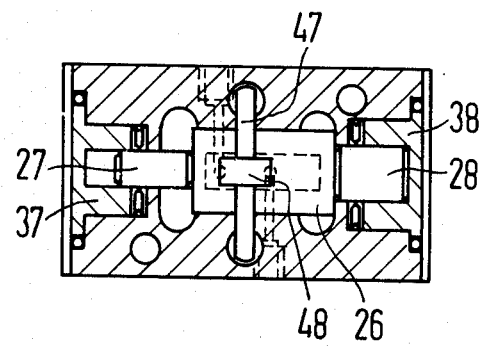
FIG. 3 is a cross-sectional view taken along lines III—III of FIG. 1.

In various Figures, like elements are referenced with like numerals.

The metering syringe of the invention comprises a unitary structural unit comprised of a combination of a valve means 1, positioned on an upper end 2a of piston-burette 2 and a pneumatic drive 3 positioned on a lower end 2b of the piston-burette 2.

The piston-burette 2 is comprised of a hollow cylinder 4, for example composed of glass, open at opposite ends 2a and 2b thereof. A piston 5 mounted on a piston-rod 6 is positioned within cylinder 2 for transferring fluids toward end 2a of the cylinder. A double-headed piston body 7 is attached to the lower free end of piston-rod 6 and comprises the piston means for the pneumatic drive 3. The double-headed piston 7 is mounted in a reciprocally moveable fashion in a cylindrical chamber 8 provided in a housing 9, which preferably is of a cuboidal shape. The lower end of chamber 8 is sealed by a cover member 11, along with an O-ring 12 to provide a completely tight closure. In substantially the same manner, a sealing ring 13 is provided along the upper portion of housing 9 to seal the piston-rod 6 against the interior walls of chamber 8 and from the piston-burette 2. The piston body 7 is provided with a suitable piston-ring 10 to operationally seal the moveable surfaces thereof against the walls of chamber 8. Air-passageways 14 and 15 for connection with a compressed air source 17 are provided along sidewalls of the chamber 8 at locations thereof beyond the two-dead-center positions of the double-headed piston 7. Conduit lines 16 and 17 respectively interconnect the compressed air source 17 with passageways 14 and 15, as shown.

As can be seen from FIG. 1 the diameter of piston-rod 6 is of such a size relative to the diameter of the piston body 7, that two pneumatically effective surfaces or piston-heads F1 and F2, which are significantly different in size from one another, are attained. With this arrangement, the smaller effective surface F1 (i.e., smaller diameter piston-head) is constantly charged or under pressure with compressed air via line 16 from the compressed air source 17 whereas the larger effective surface F2 (i.e., the larger diameter piston-head) is in communication with the compressed air source 17 via line 19 having a control valve 18, preferably actuated by compressed air, operational interposed between the surface F2 and the source 17 for controlling movement of the double-headed piston body 7. In preferred embodiments, choke valves 20 and 21 are, respectively, operational interposed in lines 16 and 19 to insure proper sequential operation of the pneumatic drive 3 relative to the valve means 1, as will be explained later.

Referring now to the operation of the pneumatic drive 3, when valve 18 is closed, then the piston-head F1 is in constant communication, via line 16, with the compressed air source 17 so that the piston body 7 assumes the position shown at FIG. 1. If the valve 18 is now opened, then the lower piston-head F2 receives compressed air via line 19 and, because piston head F2 is significantly larger (typically at least twice as large) than piston-head F1, the double-headed piston body 7 is moved upwardly, even when the other piston-head F1 continuous to be charged via line 16 from the compressed air source 17. Thus, the current piston position of piston 5 in the piston burette 2 can be immediately and accurately determined by noting the on- or off-position of valve 18.

A significant advantage of the invention is that piston rod 6 does not exhibit its own guidance but must move along the path defined by rod-passageway 8a of housing 9. The housing 9 is directly attached to the cylinder 4 of the motorized piston-burette 2 via a collar 22 concentrically arranged about passageway 8a. The lower end 2b of cylinder 4 snuggly fits onto collar 22. The other or upper end 2a of cylinder 4 is connected via a ring seal 23 to a housing 24 of valve means 1, which is claimed and described in further detail in co-pending commonly assigned application Ser. No. 124,360, filed Feb. 25, 1980.

The valve means 1 contains a slide valve means actuated by compressed air whereby a slide member 25 moves in an essentially horizontal direction relative to the vertical axis of piston rod 6, which moves essentially vertically with piston means 5 and 7. The slide member 25 is positioned in a slide mount 26 which is under the direct influence of piston-heads 27 and 28 arranged on opposite side of the slide member 25. The diameters of the piston-heads 27 and 28 are of a significantly different size so that a type of differential effect arises, somewhat similar to that experienced by the double-headed piston body 7 of the pneumatic drive 3. The slide member 25 linearly moves or glides on a pressure plate 29 which is provided, in the embodiment illustrated with three holes 30a through 30c, which extend essentially perpendicularly to the direction of motion of the slide member 25. The housing 24 is provided with a fluid passageway 31 along a bottom surface thereof which, in assembly, is aligned with hole 30a of the pressure-plate 29. Fluid passageway 31 communicates with the interior of cylinder 4. The other two holes in pressure-plate 29, holes 30b and 30c are positioned on opposite sides of hole 30a and are aligned with fluid passageways 32a and 32b, which communicate with inlet and/or outlet nozzles 33a and 33b connected to fluid flow lines outside the housing 24. The slide member 25 was at least one longitudinal groove 34 on the surface thereof facing the pressure plate 29 which is dimensioned in such a manner that it can selectively interconnect, in the embodiment shown, either holes 30a and 30b or, respectively 30a and 30c with one another.

The piston-chambers respectively receiving the piston-heads 27 and 28 are connected to the compressed air source 17 via air passageways 35 and 36 in such a manner that the smaller diameter piston-head 27 (which thus has a lower effective pneumatic surface) is continuously connected with the compressed air source 17 via line 16, which also is connected with the air passageway 14 of the pneumatic drive 3. Similarly, air-passageway 36 is in selective communication with the compressed air source 17 via line 19 and control valve 18. Thus, piston-head 27 is constantly charged with compressed air whereas piston-head 28 is controlled via the valve 18 substantially simultaneously with the layer piston-head surface F2 of the pneumatic drive 3. In order to positively insure that the valve means 1 is properly switched or activated, two choke valves 20 and 21 are, respectively, operationally interconnected in lines 16 and 19 at locations thereof downstream from the valve means 1 and between the compressed air source 17 and the pneumatic drive 3.

Thus, in operation, the position illustrated at FIG. 1 is attained when valve 18 is closed and the appertaining larger-diameter piston chambers are evacuated. In contrast thereto, piston-head 27 is constantly charged with compressed air so that it assumes the position shown in FIG. 1. Similarly, piston-head F1 is also constantly charged with compressed air so that the double-headed piston 7 assumes the position illustrated. However, if the control valve 18 is now opened, then the piston-head 28 directly receives compressed air whereas the piston-head F2 receives the full pressure of the compressed air only later since the air pressure only gradually increases through the choke valve 21. The significantly larger surface of piston-head 28 causes the slide member 28 to move toward the left with respect to FIG. 1, and thereby overcome the force of piston-head 27. In the meantime, the pressure at piston-head F2 has increased to such a degree that the double-headed piston 7 is moved upwardly, along with slaving piston 5 of the piston-burette 2.

When the control valve 18 is shut-off, the space behind the piston head 28 is immediately evacuated so that movement of the slide member immediately begins under the influence of pressurized piston-head 27 whereas the pressure behind the surface of piston-head F1 increases only slowly as a result of the insertion of choke valve 20 or, respectively, the pressure acting on the piston-head F2 is only slowly decreased as a result of the insertion of choke valve 21. Thus, only when the pressure on piston head F1 is greater than that on piston-head F2 does the double-headed piston 7 and slaving piston 5 move downwardly.

The piston-heads 27 and 28 of valve means 1 are guided in cover members 37 and 38, which are in turn sealed against the body 24 with the assistance of ring seals 39 through 42 relative to piston-heads 27 and 28 on the one hand and relative to the walls of housing 24 on the other hand. The cover members 37 and 38 or, respectively, the seals 39 and 42 are secured onto the housing 24 with auxiliary cover plates 43 and 44. The slide member 25 positioned in the slide mount 26 is biased toward the pressure plate 29 by a compression means, which in the embodiment illustrated comprises compression springs 46 which act on a shaft 47 (best seen in FIG. 3) via a ball-bearing means 48 so as to reduce the friction against the slide member and yet provide a tight seal. The springs 46 are supported against a main cover plate 49 which is attached to the housing 24 via appropriate screws 50.

The slide member 25 positioned within the slide mount 26 is interchangeable with other similarly shaped slide members having communication grooves extending in directions different from that of member 26 so that the function of the valve means 1 can be changed as desired. Further details of such interchangeable members is described in the above-referenced co-pending application.

As may be surmised from the drawings, the valve housing 24 is also of a cubical shape and is connected to the housing 9 of the pneumatic drive 3 via traction screws 51 so that a relatively short, compact structural unit arises, such as shown at FIG. 2.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

I claim as my invention:

1. In a metering syringe for conveying fluids in predetermined volumes from one container to another container, comprised of a piston-burette with a pneumatic drive connected to a valve means assembled so that said piston-burette, valve means and pneumatic drive form a unitary structural unit, the improvement comprising wherein:

said pneumatic drive is provided with a double-headed piston (7) attached to a free end of a piston rod (6) of the piston-burette (2);

said piston-rod (6) having a diameter selected of such a size relative to the diameter of the double-headed piston (7) that two pneumatically effective piston-head surfaces (F1 and F2) differing significantly in area from one another are defined, with one of said piston-head surfaces being at least twice as large in effective area relative to the other of said piston-head surfaces, said piston-head surfaces being operationally connected with a compressed air source (17) in such a manner that the piston-head surface (F1) with a relatively smaller diameter is constantly charged with compressed air from said source and the piston-head surface (F2) with a relatively larger diameter is connected to said source via a control valve (18) so as to be selectively charged with compressed air for controllably moving said double-headed piston.

2. In a metering syringe for conveying fluids in predetermined volumes from one container to another container, comprised of a piston-burette with a pneumatic drive connected to a valve means assembled so that said piston-burette, valve means and pneumatic drive form a unitary structural unit, the improvement comprising wherein:

said pneumatic drive is provided with a double-headed piston (7) attached to a free end of a piston rod (6) of the piston-burette (2);

said piston-rod (6) having a diameter selected of such a size relative to the diameter of the double-headed piston (7) that two pneumatically effective piston-head surfaces (F1 and F2) differing significantly in area from one another are defined, said piston-head surfaces being operationally connected with a compressed air source (17) in such a manner that the piston-head surface (F1) with a relatively smaller diameter is constantly charged with compressed air from said source and the piston-head surface (F2) with a relatively larger diameter is connected to said source via a control valve (18) so as to be selectively charged with compressed air for controllably moving said double-headed piston; and said valve means comprises a valve block housing positioned on an upper end of a hollow cylinder (4) of said piston-burette (2) and includes a pneumatically-controlled slide valve means and intake and discharge nozzles (33a, 33b); said slide valve means having a slide member (25) reciprocally moveable perpendicularly to the axis of motion of said piston-burette and piston-heads (27, 28) having significantly different diameters are positioned on opposite sides of said slide member and are operationally connected to a compressed air source (17) in such a manner that a piston-head (27) with a relatively smaller diameter is constantly charged with compressed air from said source and a piston-head (28) with a relatively larger diameter is connected to said source via a control valve (18) so as to be selectively charged with compressed air for controllably moving said slide member.

3. In a metering syringe as defined in claim 2 wherein corresponding air inlets (35, 36) for piston heads (27, 28) of said slide valve means are connected via conduits (16, 19) to corresponding air inlets (14, 15) of the pneumatic drive (3) of the piston burette (2) and choke valves (20, 21) are operationally inserted in said conduits (16, 19) between said compressed air source (17) and said inlets (14, 15) of the pneumatic drive and away from said air inlets (35, 36) of the valve means.

4. In a metering syringe as defined in claim 2 wherein said valve block housing (24) and a housing (9) of said pneumatic drive (3) are of a cuboidal shape, said housings each being respectively mounted on opposite ends of said cylinder (4) of the piston-burette (2) and pulled against said cylinder ends with the assistance of at least two traction bars (51).

5. In a metering syringe as defined in claim 2 wherein said slide member (25) is interchangeable arranged in a slide mount (26).

6. A metering syringe comprising, in combination:
(A) a pneumatic drive comprised of:
 a cubically-shaped housing having a cylindrical chamber therein, said housing having a rod-passageway extending from said chamber through a first outer surface thereof, said housing having a collar extending upwardly from said first outer surface and being concentrically positioned about said rod-passageway, said housing having a pair of spaced-apart air passageways providing fluid communication between upper and lower areas of said chamber and the exterior of said housing;
 a piston body positioned within said chamber and having two opposing piston-heads, said piston body being reciprocally moveable within said chamber and in snug mating relationship with sidewalls of said chamber;
 a piston-rod connected at one end thereof to said piston body and extending into said rod-passageway at the opposite end thereof, said piston rod having a select diameter relative to the diameter of said piston body so as to define different size piston-head surfaces, with an upper piston-head surface having a relatively smaller diameter and a lower piston-head surface having a relatively larger diameter;
(B) a piston-burette comprised of:
 a hollow cylindrical housing open at opposite ends thereof, a lower end of said housing being mounted about said collar of the pneumatic drive housing;
 a piston means positioned within said cylindrical housing and being reciprocally moveable within said housing and in snug mating relationship with sidewalls of said cylindrical housing;
 a piston rod connected at one end thereof to a lower surface of said piston means for movement therewith and at another end thereof to said piston-body of the pneumatic drive means;
(C) a valve means comprised of:
 a cubically-shaped valve housing mounted on an upper end of said cylindrical housing of the piston-burette, said valve housing having a chamber therein, said chamber having a bottom and being open on at least three spaced-apart surfaces of said valve housing, said valve housing having at least one fluid-passageway extending from said chamber to a surface thereof different from said spaced-apart surfaces and in communication with the interior of the hollow cylindrical housing of said piston-burette;
 a pressure-plate member positioned along the bottom of said chamber, said plate member having a multiplicity of spaced-apart apertures extending perpendicularly through said plate member with at least some of said apertures being in communication with said fluid-passageway of said valve housing;
 a slide member positioned in a linearly moveable manner substantially parallel to the bottom of said chamber and on said plate member, said slide member having at least one groove on the surface of said slide member facing said plate member for selectively interconnecting said apertures with one another;

a double-headed piston positioned in a linearly moveable manner substantially parallel to the bottom of said chamber, said piston having a slide mount interconnecting the respective piston-heads thereof, one of said piston-heads being of a larger diameter than the other piston-head, said slide mount having a chamber for snuggly receiving said slide member therein;

a pair of cover members, each having a recess therein defining a piston-chamber of a size corresponding to one of said piston-heads, said cover members being mounted on said valve housing so as to close two opposing openings of said chamber, each of said cover members having an air passageway providing fluid communication between said chamber and the exterior of said housing;

said respective piston-heads of the double-headed piston mating with a corresponding piston chamber; and (D) a compressed air means comprised of:

a source of compressed air and a first air conduit means directly interconnecting said source with a first of said air-passageways in said pneumatic drive housing which communicates with the relatively smaller piston-head surface thereof and with a first of said air-passageways in said valve housing which communicates with the relatively smaller diameter piston-heads, and a second air conduit means having a control valve therein selectively interconnecting said source with a second of said air-passageways in said pneumatic drive housing which communicates with the relatively larger piston-head surface thereof and with a second of said air-passageways in said valve housing which communicates with the relatively larger diameter piston-head.

7. A metering syringe as defined in claim 6 wherein choke valves are positioned in said first and second air conduit means between said pneumatic drive housing and said source of compressed air but away from said valve housing.

8. A metering syringe as defined in claim 6 wherein said valve means housing is secured to said pneumatic drive means housing via traction screws.

* * * * *